United States Patent Office 3,288,541
Patented Nov. 29, 1966

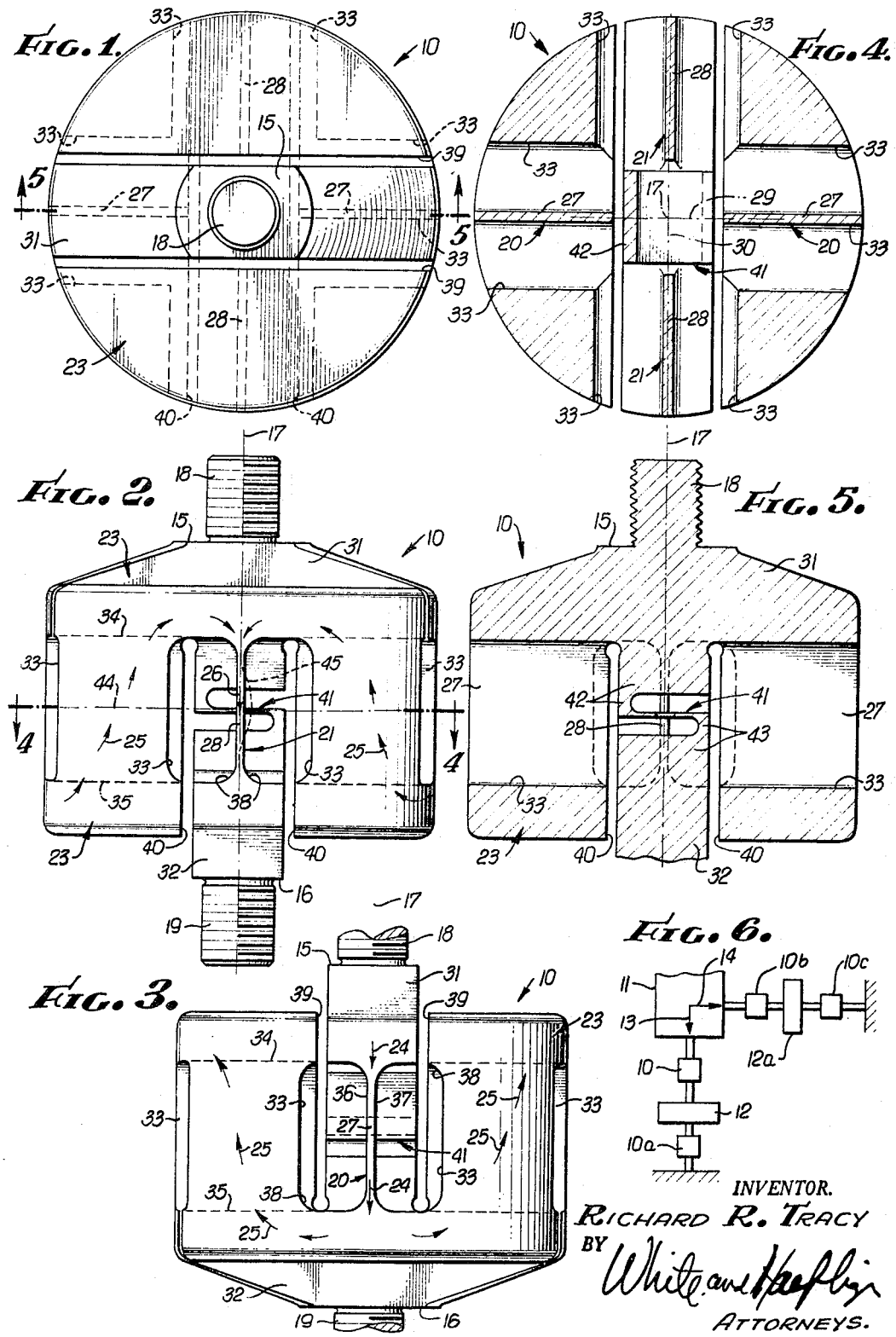

3,288,541
INTERNAL CROSS STRAP ELASTIC PIVOT
Richard R. Tracy, Pasadena, Calif., assignor to The Task Corporation, Anaheim, Calif., a corporation of California
Filed Apr. 16, 1962, Ser. No. 187,694
9 Claims. (Cl. 308—2)

This invention relates generally to elastic pivots, and more particularly has to do with a novel elastic pivot characterized as having improved load handling characteristics.

Devices of the general type with which the invention is concerned are used typically as limited motion pivots between a source of loading and load meters or sensing devices, for the purpose of transmitting only axially imposed loading to the meters, as opposed to transmitting laterally imposed loads. In other words, such devices may be characterized as acting to segregate axial from lateral loading as respects transmission thereof to the meter. These devices find wide application in force measuring and weighing systems where different meters measure longitudinal and lateral loading and are to be isolated from loading and moments other than those to be measured. The quality of such a device is therefore determined at least in part by its ability to function in this manner, and it is a major object of the invention to provide a novel device of this type which will so function in this manner, and it is a major object of the invention to provide a novel device of this type which will so function in a better or more efficient manner particularly as respects the amount of loading which the device will handle without failure, for a given overall size of the device.

As broadly conceived, the improved elastic pivot comprises a body having opposite ends longitudinally spaced apart in the direction of the body axis to receive application of force, the body also having web means and body intermediate extent for transmitting axially imposed force between the body ends and in sequence through first web means, the body intermediate extent and finally second web means. More importantly from the standpoint of efficiency of load segregation and load bearing ability for a given sized unit, the first and second web means are made to extend in substantially longitudinal planes which are spaced from the body longitudinal axis, extensions of these planes having substantially perpendicularly intersecting relation lengthwise along that axis. In addition, the body means includes transverse auxiliary web means for transmitting the bulk of the lateral and torsional forces between body opposite ends independently of the first and second web means and the body intermediate extent. The auxiliary web means also transmits the remainder of axially imposed force between the body ends, and extends in an additional plane having substantially perpendicularly intersecting relation with the body axis and with the said longitudinal plane extensions. As a result, all of the web means are adapted to flex in response to application to the body ends of moments acting in longitudinal planes, and in such manner that axial loading is transmitted through the device, which is additionally capable of carrying substantial lateral and torsional loads, the overall load handling capacity being optimized for a given size device.

Of particular advantage is the one-piece construction which the device may have due to the novel arrangement of slots, webs and recesses all of which will be discussed in detail, with consequent elimination of need for welds particularly in primary load paths or critical areas of the device. Other advantages flowing from the novel arrangement of webs, slots and recesses include the fixing of pivot or flexing axes in a common plane, the ability of the device to carry rather large lateral forces which are applied such as not to produce bending moments about the pivot axes, the predetermination of the web buckling modes to be characterized as associated with the ability of the webs to carry greater axially imposed loading without buckling by virtue of the lateral restraint imposed upon the ends of the first and second web means by the transverse web means, as opposed to other buckling modes not so characterized, and finally the ability of the device to carry torsion moments.

These and other objects of the invention, as well as the details of an illustrative embodiment, will be more fully understood from the following detailed description of the drawings, in which:

FIG. 1 is a plan view of a preferred embodiment, looking parallel to the longitudinal axis thereof;

FIG. 2 is a side elevational view of the FIG. 1 embodiment;

FIG. 3 is another side elevational view of the FIG. 1 embodiment rotated 90° relative to FIG. 1, and about the body axis;

FIG. 4 is a section taken on line 4—4 of FIG. 2;

FIG. 5 is a section taken on line 5—5 of FIG. 1;

FIG. 6 is a view showing the manner in which devices of the FIG. 1 type may be connected in load transmitting relation between a source of loading and meters or load sensing devices.

Referring first to FIG. 6, the elastic pivot 10 is shown as connected in axially load transmitting relation between the load source 11 and the meter 12. Axial loading is indicated by the arrow 13, it being understood that lateral loading in other directions may be imposed, arrow 14 being merely typical of one direction of imposed lateral loading. The load source might typically represent a rocket on a test stand, with the arrow 13 representing forces arising due to the axial thrust loading imposed during rocket firing. It would then be desired that the meter 12 measure such loading as distinguished from lateral loading 14 arising during rocket operation. Another elastic pivot 10a is shown at the axially opposite side of the meter 12, and other elastic pivots 10b and 10c are shown as connected in lateral load transmitting relation to meter 12a which measures lateral loading 14.

Referring now to FIGS. 1 through 5, the unit 10 comprises a body, typically of one-piece construction, having opposite ends 15 and 16 which are longitudinally spaced apart in the direction of the body axis 17 to receive application of force. Such force may be transmitted to and from the body by threaded fastening means typically in the form of threaded studs 18 and 19 respectively projecting axially oppositely from the opposite ends of the body.

The body also has first and second web means respectively indicated at 20 and 21 in FIGS. 3 and 2, as well as body intermediate extent 23 for transmitting the bulk of axially imposed force between the body ends and in sequence through the first web means 20 as indicted by the arrow 24, then through the body intermediate extent as indicated by the arrow 25 in FIG. 3, and then through the second web means 21 as indicated by the arrow 26 in FIG. 2. As shown in FIG. 4, the first web means may typically but not necessarily comprise a first pair of webs 27 which are spaced apart at opposite sides of the body longitudinal axis 17, and the second web means may typically but not necessarily comprise a second pair of webs 28 spaced apart at opposite sides of the axis 17. The two webs 27 extend in a common plane having an extension 29 which intersects the axis 17 along its length, and also the two webs 28 extend in a common plane having an extension 30 which intersects the axis 17 as well as the extension 29. In other words, the extensions 29 and 30 have substantially perpendicularly intersecting relation lengthwise along the axis 17 as shown in FIG. 4. In this regard, it will be observed in FIGS. 2, 3 and 5 that the body means has rigid beam portions 31 and 32 through which loading is transmitted between the body opposite ends 15 and 16 and the web means 20 and 21.

Further in connection with what has been described, the one-piece construction of the body is facilitated by the provision of four pairs of recesses 33, the recesses of each pair being located at transversely opposite sides of a web such as has been described. These recesses extend from the cylindrical outer side of the body to the body interior where they intersect as best seen in FIG. 4. Furthermore, the recesses are longitudinally elongated between a pair of longitudinaly spaced parallel planes 34 and 35 perpendicular to the axis 17 as seen in FIGS. 2 and 3. Thus, the recesses have equal longitudinal extent, and the recesses of each pair are so formed that the web between the recesses has reduced lateral thickness between parallel opposite faces such as are shown at 36 and 37 in FIG. 3. The corners of the recesses 33 are rounded or curved typically as shown at 38 to reduce stress concentrations.

The body also contains two pairs of slots, the first pair of slots being shown at 39 in FIG. 3 and the second pair being shown at 40 in FIG. 2. Slots 39 extend from the outside of the body near end 15 thereof into communication with the recesses 33 at opposite sides of the first web means 20, whereas the second pair of slots 40 extend from the outside of the body near end 16 thereof into communication with the recesses 33 at opposite sides of the second web means 21. As shown, the slots 39 extend in parallel planes which are substantially perpendicular to the parellel planes of slots 40 and the rigid beam portions 31 and 32 are formed between the respective pairs of slots 39 and 40. Also the web 41 is confined between the planes defined by slots 39 and 40.

The relatively elongated extent of the webs 27 and 28 is advantageous from the standpoint of increased flexibility thereof so that the device is sensitive to relatively small moments acting in longitudinal planes and will flex in response thereto, thereby permitting the system incorporating these devices to better segregate the axial and lateral loads. In this connection, the webs are adapted to flex in response to application to the body ends of moments acting in longitudinal planes parallel to the body axis 17. On the other hand, such relatively elongated extent of the webs raises problems of buckling, and particularly the mode of buckling, it being realized that buckling can occur in different modes depending upon restraints or lack thereof imposed upon the webs. To take advantage of that buckling mode which is associated with the ability of the webs to carry maximum axial load without buckling, the body means includes an auxiliary web means 41 for transmitting the laterally imposed force between the rigid beam portions 31 and 32 and independently of force transmission through the first and second web means 21 and 20. The web means 41 extends in a plane having substantially perpendicularly intersecting relation with the axis 17 and the longitudinal planar extents 29 and 30. In particular, the web means 41 may comprise the single web in the space between the two webs 27 and the two webs 28, and the opposite ends of the auxiliary web 41 are respectively connected at 42 and 43 in load transmitting relation with the rigid beam portions 31 and 32 of the body means, as best seen in FIG. 5.

Referring to FIG. 2, it will be seen that the auxiliary web 41 or cross strap extends in a plane 44 which is midway between the two planes 34 and 35. and accordingly the plane 44 may be said to intersect the webs 27 and 28 midway between their longitudinally opposite ends. The auxiliary web 41 fixes the effective axes of rotation of end 15 relative to end 16 to have loci in plane 44. Also, the auxiliary or transverse web 41 fixes the buckling mode of the webs 27 and 28 in such manner that maximum deflection during buckling occurs in the plane 44, such theoretical buckling of web 28 being indicated by the broken line 45 in FIG. 2. This buckling mode is that which is most favorable from the standpoint of axial load transmitting capacity, without buckling, of the webs 27 and 28, and accordingly the auxiliary web 41 may be said to contribute substantially to the efficiency of the flexure unit. It is furthermore pointed out that the location of the auxiliary web 41 centrally of the flexure unit and in design association with the slots 39 and 40 and the recesses 33 contributes to the small size of the flexure unit in relation to its load bearing capacity, and very importantly, to the possibility of one-piece design of the unit. The latter characteristic is significant as respects the elimination of welds or joints in primary load paths or critical areas.

The auxiliary web 41 is further characterized as flexing in response to moments acting in longitudinal planes and imposed on the body through the opposite ends thereof, such flexing of web 41 being characterized as essentially due to bending when the webs 28 flex, and essentially torsional flexure when the webs 27 flex. Finally, the major portions of the axial loading is taken through the webs 27 and 28 as distinguished from transmission through the web 41, due to the orthogonality of the web 41 with respect to the webs 27 and 28.

I claim:

1. An improved elastic pivot, comprising a one-piece body having opposite ends longitudinally spaced apart in the direction of the body axis to receive application of force and having first and second web means integral with the body and respectively extending from said ends and also having a body intermediate extent portion proximate said web means for transmitting the bulk of axially imposed force between said body ends and in sequence through first web means, said body intermediate extent and second web means, said first and second web means extending in substantially longitudinal planes disposed substantially at right angles to each other and which are spaced from said axis, extensions of said planes having substantially perpendicularly intersecting relation with each other lengthwise along said axis, and said body means including auxiliary web means for transmitting lateral forces between the body ends independently of force transmission through the first and second web means and extending in an additional plane having substantially perpendicularly intersecting relation with said axis and said longitudinal plane extensions, said auxiliary web means being located in the space between the inner ends of said first and second web means and also having its opposite ends integral with and extending in force transmitting relation respectively from the opposite ends of the body from which extend the first and second web means, said web means being adapted to flex in response to application to said body ends of force other than axial.

2. The invention as defined in claim 1 in which said first web means comprises a first pair of webs spaced apart at opposite sides of said axis, said second web means comprises a second pair of webs spaced apart at opposite sides of said axis, and said auxiliary web means includes at least one web in the space between said first pair of webs and also between the second pair of webs.

3. The invention as defined in claim 2 in which the webs of said first and second pairs have reduced lateral thickness between a pair of longitudinally spaced planes perpendicular to said axis and at opposite sides of said additional plane.

4. The invention as defined in claim 3 in which each of the webs of said first and second pairs have parallel opposite faces.

5. The invention as defined in claim 2 in which said body contains four pairs of recesses, the recesses of each pair being located at transversely opposite sides of a web of said first and second pairs of web means, said recesses extending from the body outer side to the body interior, said recesses being longitudinally elongated.

6. The invention as defined in claim 5 in which the body contains two pairs of slots, the first pair of slots extending from one end of the body into communication with the recesses at opposite sides of said first pair of webs, and the second pair of slots extending from the opposite end of said body into communication with the recesses at opposite sides of said second pair of webs said auxiliary web means being confined between planes defined by said first and second pairs of slots.

7. The invention as defined in claim 6 in which opposite ends of said auxiliary web are respectively connected in load transmitting relation with the portions of the body between said pairs of slots.

8. The invention as defined in claim 6 including fastening means respectively projecting axially oppositely from the portions of the body between said pairs of slots.

9. The invention as defined in claim 2 in which said additional plane intersects said body axis midway between the body opposite ends.

References Cited by the Examiner

UNITED STATES PATENTS

| | | | |
|---|---|---|---|
| 2,860,495 | 11/1958 | Stark | 64—15 X |
| 2,966,049 | 12/1960 | Ormond | 287—85 X |
| 2,969,656 | 1/1961 | Reuter | 287—85 X |
| 2,984,996 | 5/1961 | Ormond | 64—15 |
| 3,038,331 | 6/1962 | Henry et al. | |
| 3,169,613 | 2/1965 | Webb | 64—15 |

CARL W. TOMLIN, *Primary Examiner.*

A. V. KUNDRAT, *Assistant Examiner.*